US011745917B2

United States Patent
Chen et al.

(10) Patent No.: US 11,745,917 B2
(45) Date of Patent: Sep. 5, 2023

(54) SHOCK-ABSORBING PALLETS FOR TRANSPORTING SERVERS

(71) Applicant: QUANTA COMPUTER INC., Taoyuan (TW)

(72) Inventors: Chao-Jung Chen, Taoyuan (TW); Ming-Sheng Chang, Taoyuan (TW); Sheng-Wei Tang, Taoyuan (TW); Ta-Chih Chen, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 9 days.

(21) Appl. No.: 17/550,574

(22) Filed: Dec. 14, 2021

(65) Prior Publication Data

US 2023/0182956 A1 Jun. 15, 2023

(51) Int. Cl.
*B65D 19/38* (2006.01)
*B65D 19/00* (2006.01)
*F16F 9/54* (2006.01)

(52) U.S. Cl.
CPC ......... *B65D 19/38* (2013.01); *B65D 19/0071* (2013.01); *F16F 9/54* (2013.01); *B65D 2519/00044* (2013.01); *B65D 2519/00273* (2013.01)

(58) Field of Classification Search
CPC ........... B65D 19/38; B60N 2/54; B60N 2/544
USPC ....................... 108/57.12; 248/562, 565, 560
See application file for complete search history.

(56) References Cited

U.S. PATENT DOCUMENTS

| 1,812,861 | A | * | 7/1931 | Chase | B62B 3/0625 |
| | | | | | 108/136 |
| 2,597,800 | A | * | 5/1952 | Hussman | F16F 13/00 |
| | | | | | 248/565 |
| 3,878,795 | A | * | 4/1975 | Janda | B65D 19/14 |
| | | | | | 217/43 A |

(Continued)

FOREIGN PATENT DOCUMENTS

| CN | 109051191 A | 12/2018 |
| TW | M570303 A | 11/2018 |

OTHER PUBLICATIONS

TW Office Action for Application No. 111114404, dated Nov. 23, 2022, w/ First Office Action Summary.

(Continued)

*Primary Examiner* — Jose V Chen
(74) *Attorney, Agent, or Firm* — NIXON PEABODY LLP

(57) ABSTRACT

Embodiments of the disclosure are directed to a transportation system for carrying servers. The transportation system includes a server rack and a shock-absorbing pallet. The shock-absorbing pallet is secured under the server rack and configured to move relative to the server rack to dampen vibration during transportation of the server rack. The shock-absorbing pallet includes a top cover, a bottom cover, one or more isolation devices, and one or supporting layers. The one or more isolation devices are disposed between the top cover and the bottom cover. Each isolation device includes a shock-absorbing component coupled to the top cover and the bottom cover. The one or more supporting layers are secured between the top cover and the bottom cover around the one or more isolation devices. The one or more supporting layers have a plurality of slots for guiding a pallet lifter therethrough.

20 Claims, 4 Drawing Sheets

(56) References Cited

U.S. PATENT DOCUMENTS

| | | | | |
|---|---|---|---|---|
| 4,245,826 A * | 1/1981 | Wirges | A47C 3/30 | 267/152 |
| 4,362,287 A * | 12/1982 | Grongstad | B63B 29/12 | 248/563 |
| 5,881,507 A * | 3/1999 | Yoo | E04H 9/022 | 248/565 |
| 6,405,880 B1 * | 6/2002 | Webb | A47F 1/12 | 211/187 |
| 6,418,862 B1 * | 7/2002 | Heil | B65D 19/0028 | 108/57.12 |
| 7,175,150 B2 * | 2/2007 | Chi | F16F 3/10 | 248/565 |
| 7,219,609 B1 * | 5/2007 | Utz | B65D 19/44 | 108/55.3 |
| 7,779,765 B2 * | 8/2010 | Donnell, Jr. | B65D 19/0016 | 108/56.1 |
| 9,227,757 B1 * | 1/2016 | Green | B65D 19/0095 | |
| 9,422,083 B1 * | 8/2016 | Embleton | H05K 7/186 | |
| 9,932,144 B2 * | 4/2018 | Embleton | B65D 19/0012 | |
| 10,569,931 B2 * | 2/2020 | Hirose | F16M 11/048 | |
| 2003/0037710 A1 * | 2/2003 | Monson | B65D 19/0012 | 108/57.12 |
| 2006/0032412 A1 * | 2/2006 | Harner | B65D 19/42 | 108/55.1 |
| 2007/0221102 A1 * | 9/2007 | Reinhall | B65D 19/0073 | 108/57.12 |
| 2008/0250987 A1 * | 10/2008 | Hartel | B65D 19/0048 | 108/57.12 |
| 2010/0294176 A1 * | 11/2010 | Cummins | F16F 15/02 | 29/428 |
| 2011/0284711 A1 * | 11/2011 | Hsiao | H05K 7/1485 | 248/346.03 |
| 2014/0086718 A1 * | 3/2014 | Bush | B65D 19/0073 | 414/800 |
| 2014/0090581 A1 * | 4/2014 | Schultz | B65D 19/0095 | 248/634 |
| 2016/0061285 A1 * | 3/2016 | Green | B65D 19/0028 | 267/141 |
| 2017/0107013 A1 | 4/2017 | Yoshifusa et al. | | |

OTHER PUBLICATIONS

TW Search Report for Application No. 111114404, dated Nov. 23, 2022, w/ First Office Action.

* cited by examiner

SHOCK-ABSORBING PALLETS FOR TRANSPORTING SERVERS

FIELD OF THE INVENTION

The present invention relates generally to transportation of information-handling systems, and more specifically, to shock-absorbing pallets for transporting information-handling systems like servers.

BACKGROUND OF THE INVENTION

Servers, networking devices, storage systems, and other devices known in the art are sometimes used in racks. Each rack can house multiple devices coupled to each other as well as devices in other racks. Some of those racks are relatively tall, which enables the rack to house a relatively large number of devices. For example, conventional 42 unit (42U) racks may measure up to 7 feet tall, and other rack types can exceed that height. The racks are rigidly mounted to a pallet for transportation. The racks are subject to external forces that can cause movement and vibration in different directions, which may result in tipping, turning, and shaking. Accordingly, it is desirable to have a pallet that can absorb shocks experienced by the racks due to these external forces.

SUMMARY OF THE INVENTION

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

According to certain aspects of the present disclosure, a shock-absorbing pallet is disclosed. The shock-absorbing pallet includes a top cover, a bottom cover, one or more isolation devices, and one or supporting layers. The one or more isolation devices are disposed between the top cover and the bottom cover. Each isolation device includes a shock-absorbing component coupled to the top cover and the bottom cover. The one or more supporting layers are secured between the top cover and the bottom cover around the one or more isolation devices. The one or more supporting layers have a plurality of slots for guiding a pallet lifter therethrough.

According to certain aspects of the present disclosure, a transportation system for servers is disclosed. The transportation system includes a server rack and a shock-absorbing pallet. The shock-absorbing pallet is secured under the server rack and configured to move relative to the server rack to dampen vibration during transportation of the server rack. The shock-absorbing pallet includes a top cover, a bottom cover, one or more isolation devices, and one or more supporting layers. The one or more isolation devices are disposed between the top cover and the bottom cover. Each isolation device includes a shock-absorbing component coupled to the top cover and the bottom cover. The one or more supporting layers are secured between the top cover and the bottom cover around the one or more isolation devices. The one or more supporting layers have a plurality of slots for guiding a pallet lifter therethrough.

According to certain aspects of the present disclosure, the shock-absorbing component includes a cylindrical body having a first stopper panel, a second stopper panel, and a suspension piston. The first stopper panel is coupled to a first bracket. The first bracket is attached to the top cover. The second stopper panel is opposite to the first stopper panel. The second stopper panel is coupled to a second bracket that is attached to the bottom cover. The suspension piston is disposed in the cylindrical body and configured to move between the first bracket and the second bracket.

According to certain aspects of the present disclosure, the shock-absorbing component includes a suspension spring disposed around the cylindrical body between the first stopper panel and the second stopper panel, wherein a displacement of the suspension piston causes the suspension spring to compress between the first stopper panel and the second stopper panel.

According to certain aspects of the present disclosure, the top cover and the bottom cover are formed from a thermally-insulated material.

According to certain aspects of the present disclosure, the top cover and the bottom cover are generally rectangular in shape.

According to certain aspects of the present disclosure, the one or more isolation devices are disposed at or around a center of the shock-absorbing pallet to enable uniform force distribution.

According to certain aspects of the present disclosure, the shock-absorbing pallet includes four isolation devices disposed adjacent to four corners of the shock-absorbing pallet.

According to certain aspects of the present disclosure, the shock-absorbing components of any two isolation devices along a length of the shock-absorbing pallet move towards each other.

According to certain aspects of the present disclosure, the shock-absorbing components of any two isolation devices along a breadth of the shock-absorbing pallet move in the same direction.

According to certain aspects of the present disclosure, each of the one or more supporting layers are formed from an elastic material, an elastomeric material, or a foam material.

According to certain aspects of the present disclosure, the one or more supporting layers are distributed evenly from a center of the shock-absorbing pallet around the one or more isolation devices.

According to certain aspects of the present disclosure, the one or more supporting layers are disposed such that there are two slots along a length and another two slots along a breadth of the shock-absorbing pallet for guiding the pallet lifter along the length and the breadth, respectively.

According to certain aspects of the present disclosure, the shock-absorbing pallet has a length greater than a length of the server rack and a breadth greater than a breadth of the server rack.

The above summary is not intended to represent each embodiment or every aspect of the present disclosure. Rather, the foregoing summary merely provides an example of some of the novel aspects and features set forth herein.

The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

Figure 1:
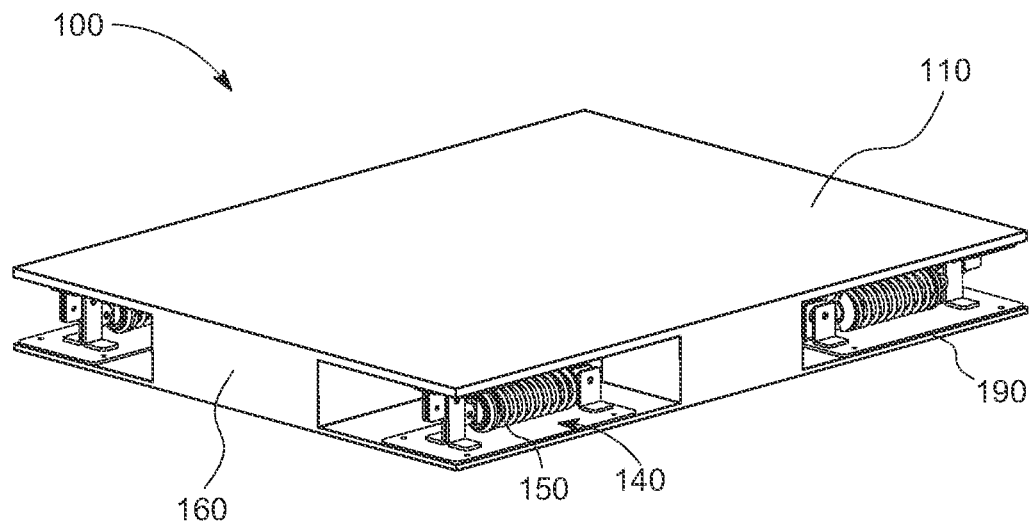
FIG. 1 shows an outer perspective view of a pallet for transporting servers, according to certain aspects of the present disclosure.

The present disclosure is susceptible to various modifications and alternative forms, and some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION

Embodiments of the disclosure are directed to shock-absorbing pallets for transporting information-handling systems like servers. The shock-absorbing pallets have one or more isolation devices and one or more supporting layers around each isolation device for absorbing shocks experienced by server racks due to external forces. Each isolation device includes a shock-absorbing component that can dampen the shocks by allowing relative displacement of the server rack with respect to the pallet, when the server rack experiences external forces such as those during transportation.

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

Figure 2:
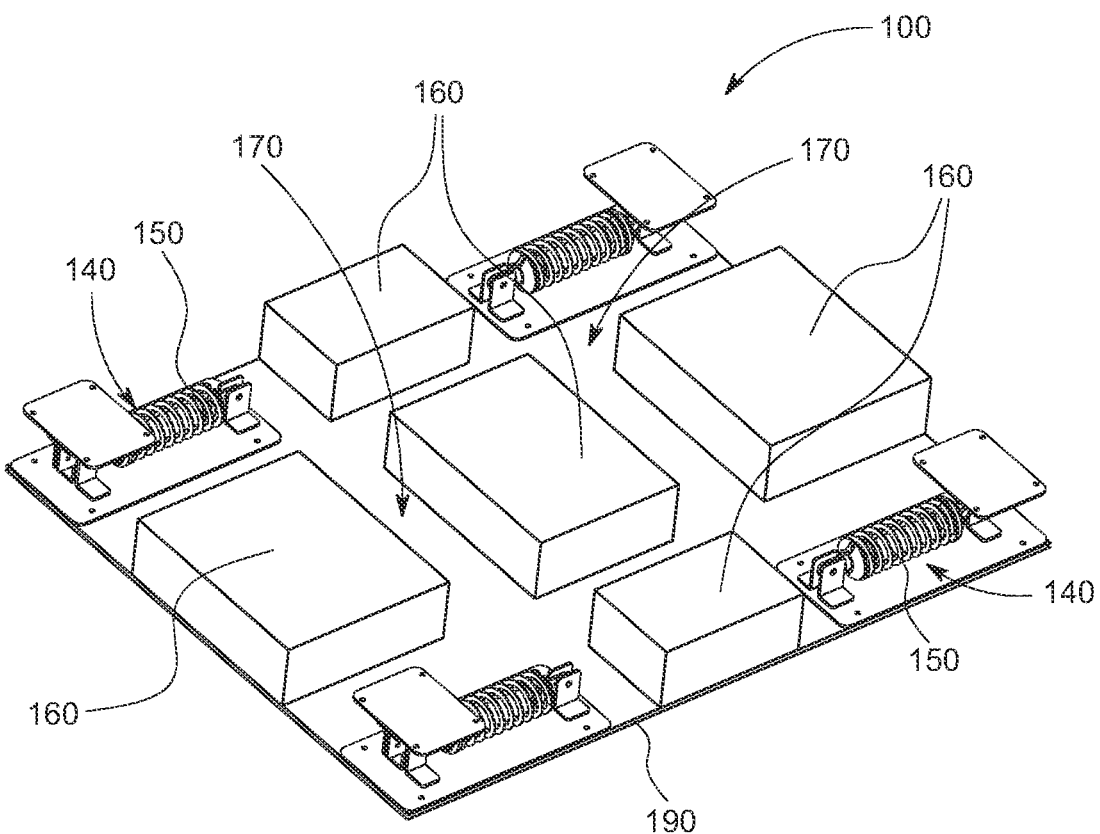
FIG. 2 shows an inner perspective view of the pallet of FIG. 1, when a top cover of the pallet is removed, according to certain aspects of the present disclosure.

Referring to the figures, FIGS. 1-2 are best understood when viewed in conjunction. FIG. 1 shows an outer perspective view of a pallet 100 for transporting servers. The pallet 100 includes a top cover 110, a bottom cover 190, isolation devices 140, and supporting layers 160. FIG. 2 shows an inner perspective view of the pallet 100, when the top cover 110 is removed. This view illustrates an example arrangement of the isolation devices 140 and the supporting layers 160.

The top cover 110 and the bottom cover 190 are formed from a thermally-insulated material such as, but not limited to, wood, plastic, etc. In some embodiments, the top cover 110 and the bottom cover 190 have equal dimensions. In an example embodiment, the top cover 110 and the bottom cover 190 may be generally rectangular in shape and may be equal in length and breadth. In another example embodiment, the top cover and the bottom cover may be circular in shape and have equal diameters. In yet another example embodiment, the top cover and the bottom cover may be elliptical in shape and have equal major and minor axes.

In some embodiments, the isolation devices 140 are disposed at or around a center of the pallet 100 between the top cover 110 and the bottom cover 190. This enables uniform force distribution, when the pallet 100 is exposed to external forces. In an example embodiment such as shown in FIG. 2, when the top cover 110 and the bottom cover 190 are rectangular in shape, there may be four isolation devices disposed at or adjacent to four corners of the pallet 100. In another example embodiment, when the top cover and the bottom cover are circular in shape, there may be four isolation devices disposed at or adjacent to four ends of diameters that are perpendicular to each other. In yet another example embodiment, when the top cover and the bottom cover are circular in shape, there may be four isolation devices disposed at or adjacent to four ends of major and minor axes and one isolation device disposed at the center. In other embodiments, the positions of the isolation devices 140 may be skewed according to the nature of forces experienced by the pallet 100.

Each isolation device 140 includes a shock-absorbing component 150 coupled to the top cover 110 and the bottom cover 190. The isolation device 140 absorbs a shock, in response to an external force, through relative movement of the shock-absorbing component 150 with respect to a load (e.g., a server rack 410 shown in FIG. 4A) on the pallet 100. This relative movement is facilitated by compression of a suspension spring disposed in the shock-absorbing component 150. The shock-absorbing component 150 is described in further detail below with respect to FIGS. 3A-3B. In the example embodiment shown in FIG. 2, the shock-absorbing components 150 of two isolation devices 140 along the length of the pallet 100 are configured to move towards each other to absorb the shock, while the shock-absorbing components 150 of two isolation devices 140 along the breadth of the pallet 100 are configured to move in the same direction to absorb the shock.

In some embodiments, the supporting layers 160 are secured between the top cover 110 and the bottom cover 190 around the isolation devices 140. The supporting layers 160 are formed from an elastic material, an elastomeric material, or a foam material. In some embodiments, the supporting layers 160 may be airbags. The supporting layers 160 are arranged such that a plurality of slots 170 are formed between the supporting layers 160. The plurality of slots 170 helps guide arms of a pallet lifter (e.g., pallet lifter 450 shown in FIG. 4B) through them such that the pallet 100 can be lifted.

In some embodiments, the supporting layers 160 are distributed evenly from a center of the pallet 100 around the isolation devices 140. In an example embodiment, such as shown in FIG. 2, there is a central supporting layer 160 separated by slots 170 from two supporting layers 160 along the length of the pallet 100. The central supporting layer 160 is also separated by slots 170 from two supporting layers 160 along the breadth of the pallet 100. Accordingly, there are two slots 170 each along a length and a breadth of the pallet 100 for guiding a pallet lifter therethrough. In another example embodiment, there may be a central supporting layer separated by slots from a number of arc-shaped supporting layers along the circumference of the pallet. In other embodiments, the positions of the supporting layers may be skewed according to the nature of forces experienced by the pallet.

Figure 3A:
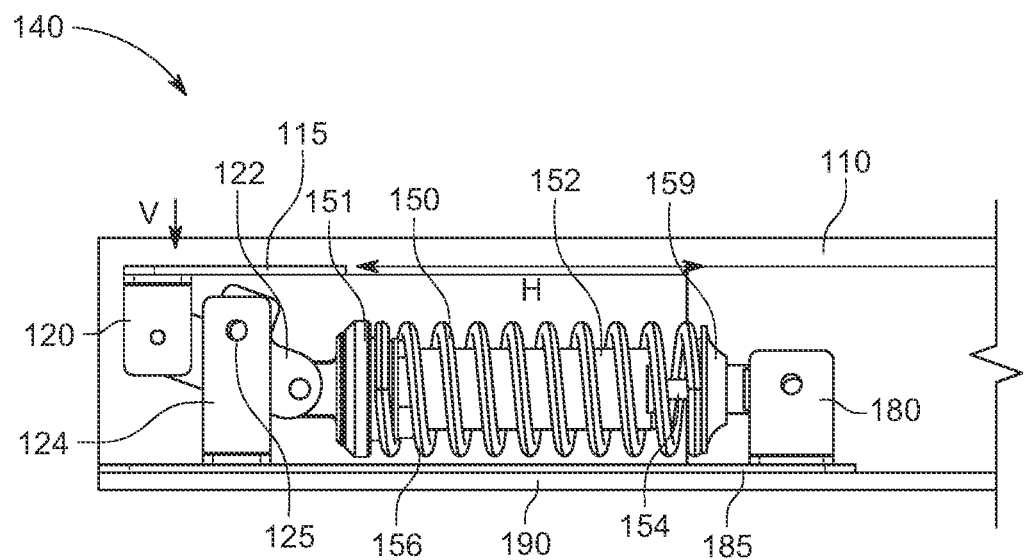
FIG. 3A shows a side view of a shock-absorbing component on the pallet of FIG. 1 in a decompressed state, according to certain aspects of the present disclosure.
Figure 3B:
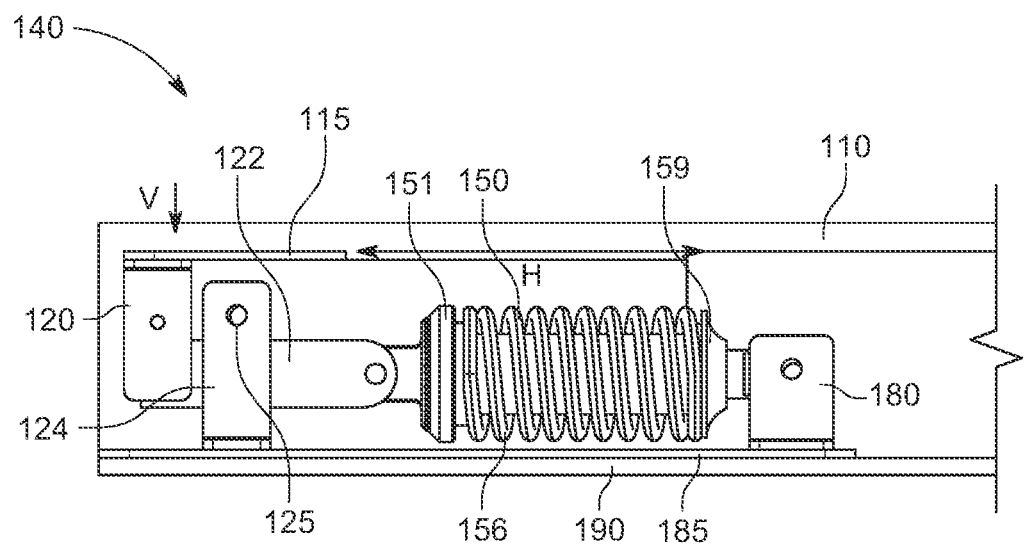
FIG. 3B shows a side view of the shock-absorbing component of FIG. 3A in a compressed state when an external force is applied, according to certain aspects of the present disclosure.

FIGS. 3A-3B show a side view of the isolation device 140 configured to absorb shocks due to external forces on the pallet 100. The isolation device 140 has a first bracket 120 attached (e.g., with a screw) to a first plate 115 mounted horizontally along the top cover 110 of the pallet 100. The first bracket 120 projects downward towards the bottom cover 190 and is located upstream of the shock-absorbing component 150. The isolation device 140 has a second bracket 180 attached (e.g., with a screw) to a second plate 185 mounted horizontally along the bottom cover 190 of the pallet 100. The second bracket 180 projects upward towards the top cover 110 and is located downstream of the shock-absorbing component 150. A third bracket 124 is coupled to the second plate 185 and projects upward towards the top cover 110. The third bracket 124 is disposed between the first bracket 120 and the shock-absorbing component 150. The first bracket 120, the second bracket 180, and the third bracket 124 are formed from a metal or an alloy. A linking member 122 is rotatably connected between the first bracket 120 and the shock-absorbing component 150. The linking member 122 pivots about a hinge point 125 on the third bracket 124 during rotation.

The shock-absorbing component 150 has a cylindrical body 152 and a suspension spring 156 disposed around the cylindrical body 152. In some embodiments, the cylindrical body 152 is made from a sheet metal or a free-cutting steel such as, but not limited to, stainless steel, carbon steel, and the like. The cylindrical body 152 has a first stopper panel 151 coupled to the first bracket 120 and a second stopper panel 159 coupled to the second bracket 180. Thus, the first stopper panel 151 and the second stopper panel 159 are disposed on opposite ends of the cylindrical body 152. A suspension piston 154 is disposed in the cylindrical body 152 and configured to move between the first bracket 120 and the second bracket 180 upon application of a force on the first bracket 120.

The suspension spring 156 is disposed around the cylindrical body 152 between the first stopper panel 151 and the second stopper panel 159. A displacement of the suspension piston 154 causes the suspension spring 156 to compress between the first stopper panel 151 and the second stopper panel 159.

During operation, when an external force is applied on the pallet 100, a vertical component V of the external force causes rotation of the linking member 122 about the hinge point 125 in a counterclockwise direction. As shown in FIG. 3B, the rotation presses the first stopper panel 151 with a horizontal force H to move towards the second bracket 180. This results in compression of the suspension spring 156 against the second stopper panel 159. The compression of the suspension spring 156 absorbs the shock due to the external force and may generate heat that is subsequently dissipated through the isolation device 140. The suspension spring 156 can return to a decompressed state, once the external force is no longer applied, as shown in FIG. 3A.

Figure 4A:
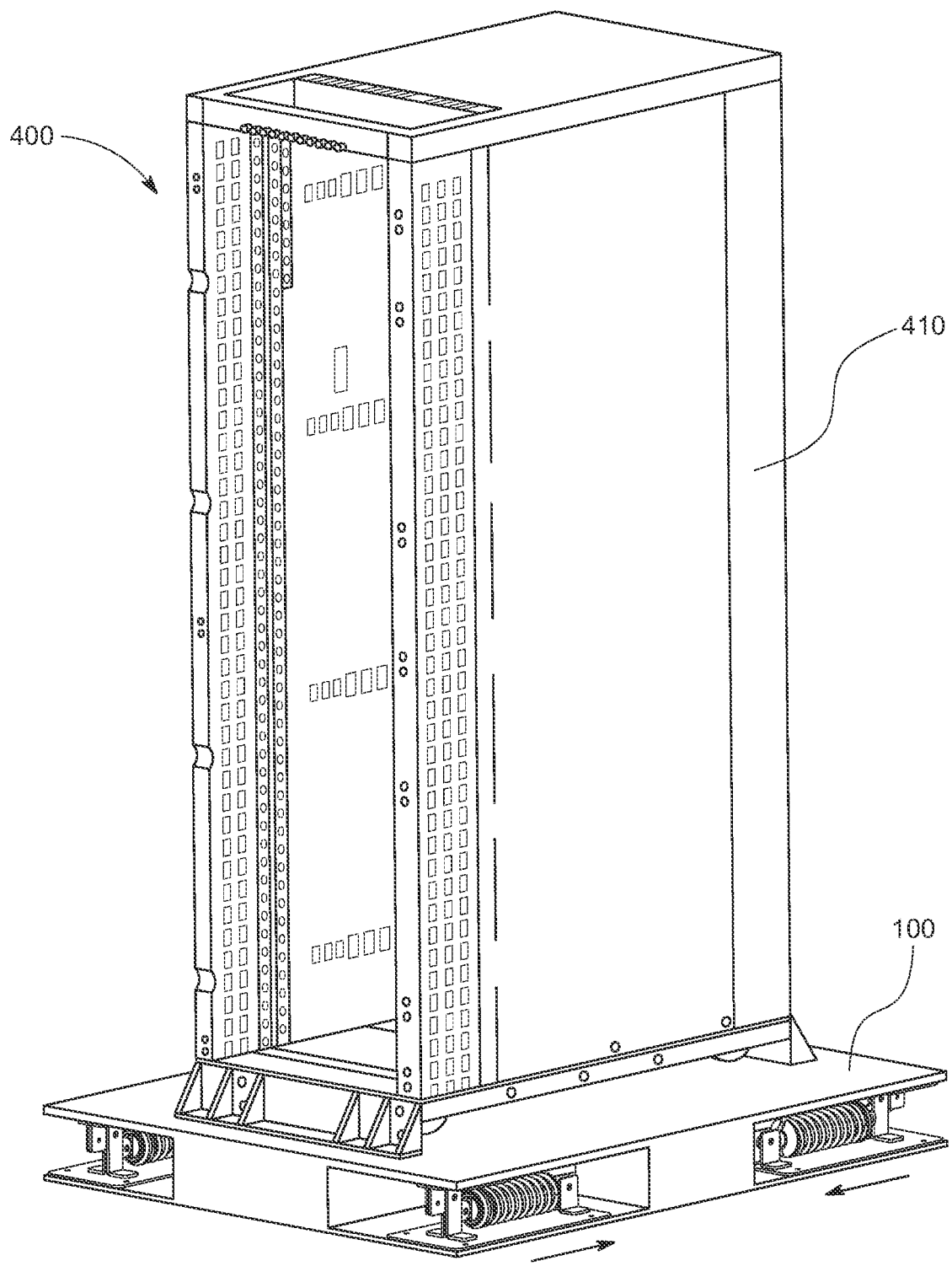
FIG. 4A shows a perspective view of a server rack secured on the pallet of FIG. 1 for transportation, according to certain aspects of the present disclosure.

FIG. 4A shows a perspective view of a transportation system 400 for carrying a server rack 410 (or another information-handling system). The transportation system 400 has the pallet 100 secured under the server rack 410 through fasteners such as bolts, screws. The pallet 100 has a larger area for accommodating the server rack 410 thereon. In the example embodiment shown in FIG. 4A, the pallet 100 has a length and a breadth greater than a length and a breadth of the server rack 410, respectively. The pallet 100 moves relative to the server rack 410 in response to external forces to dampen vibration experienced by the server rack 410 during transportation.

Figure 4B:
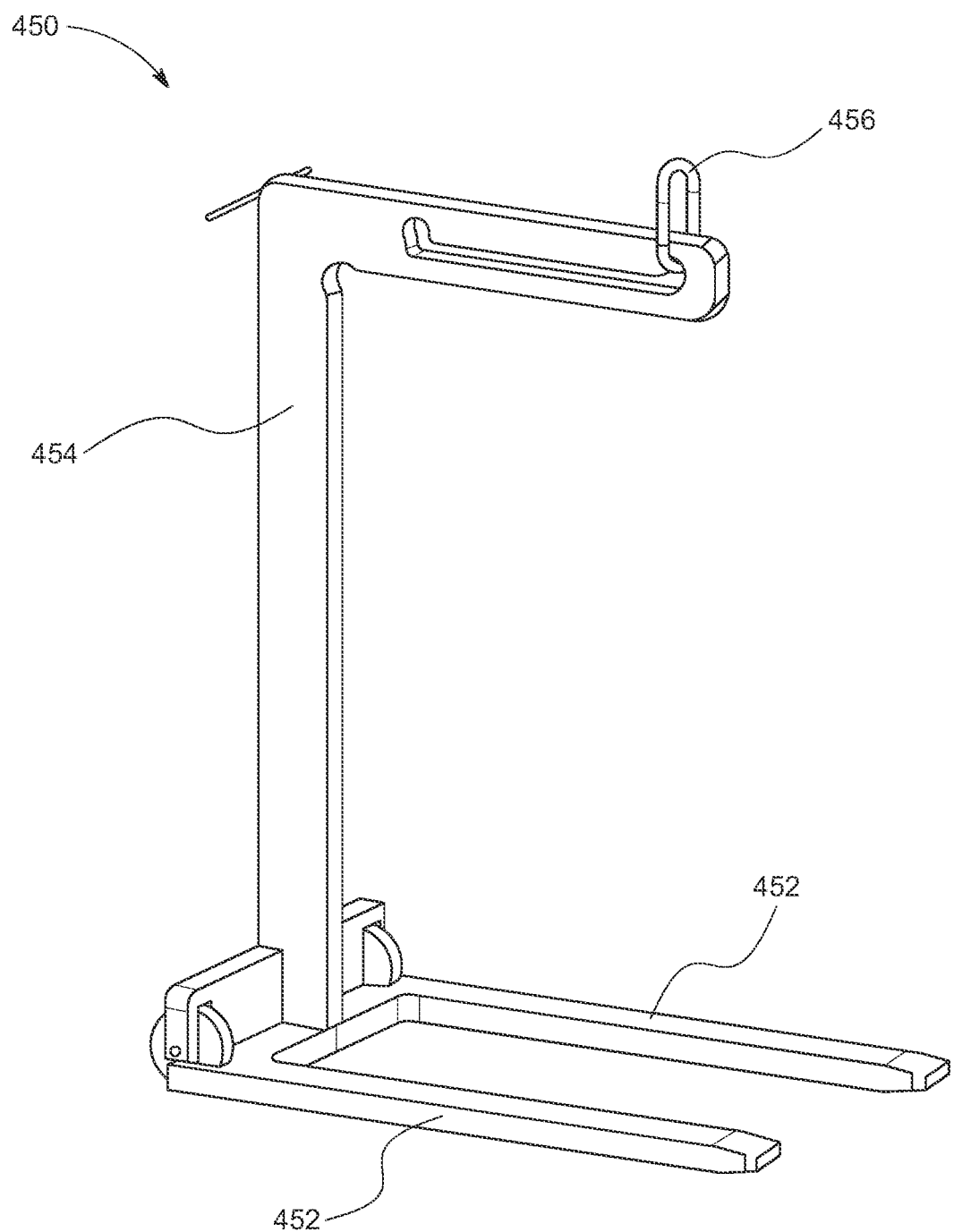
FIG. 4B shows a perspective view of a pallet lifter used to lift the server rack of FIG. 4A, according to certain aspects of the present disclosure.

FIG. 4B shows a perspective view of an example pallet lifter 450 used to lift the server rack 410. The pallet lifter 450 includes two arms 452 that can be guided through the slots 170 (shown in FIGS. 1-2). The pallet lifter 450 has a body 454 with a hook 456 for lifting the pallet lifter 450.

Embodiments of the shock-absorbing pallets described herein can be advantageously used to absorb shocks experienced by server racks, such as those during shipping, transportation, and delivery. In particular, the shock-absorbing pallets have arrangements of isolation devices and supporting layers to dampen the shocks experienced by the server racks due to external forces. This helps protect the servers in the racks from physical damage when they are transported.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A shock-absorbing pallet comprising:
   a top cover;
   a bottom cover;
   a plurality of isolation devices disposed between the top cover and the bottom cover, each isolation device comprising a shock-absorbing component coupled to the top cover and the bottom cover, the shock-absorbing component having a suspension spring that compresses in a horizontal direction in response to an external force being applied in a vertical direction to the top cover; and
   one or more supporting layers secured between the top cover and the bottom cover around the one or more isolation devices, the one or more supporting layers forming in-between a plurality of slots for guiding a pallet lifter therethrough.

2. The shock-absorbing pallet of claim 1, wherein the shock-absorbing component further has a cylindrical body including:
   a first stopper panel coupled to a first bracket, the first bracket attached to the top cover;
   a second stopper panel opposite to the first stopper panel, the second stopper panel coupled to a second bracket that is attached to the bottom cover; and
   a suspension piston disposed in the cylindrical body and configured to move between the first bracket and the second bracket.

3. The shock-absorbing pallet of claim 2, wherein the suspension spring is disposed around the cylindrical body between the first stopper panel and the second stopper panel, wherein a displacement of the suspension piston causes the suspension spring to compress between the first stopper panel and the second stopper panel.

4. The shock-absorbing pallet of claim 1, wherein the top cover and the bottom cover are formed from a thermally-insulated material.

5. The shock-absorbing pallet of claim 1, wherein the top cover and the bottom cover are generally rectangular in shape.

6. The shock-absorbing pallet of claim 5, wherein the plurality of isolation devices includes four isolation devices disposed adjacent to four corners of the shock-absorbing pallet.

7. The shock-absorbing pallet of claim 6, wherein the shock-absorbing components of any two isolation devices along a length of the shock-absorbing pallet move towards each other.

8. The shock-absorbing pallet of claim 6, wherein the shock-absorbing components of any two isolation devices along a breadth of the shock-absorbing pallet move in the same direction.

9. The shock-absorbing pallet of claim 5, wherein the one or more supporting layers are disposed such that there are two slots along a length and another two slots along a breadth of the shock-absorbing pallet for guiding the pallet lifter along the length and the breadth respectively.

10. The shock-absorbing pallet of claim 1, wherein the one or more isolation devices are disposed at or around a center of the shock-absorbing pallet to enable uniform force distribution.

11. The shock-absorbing pallet of claim 1, wherein each of the one or more supporting layers are formed from an elastic material, an elastomeric material, or a foam material.

12. The shock-absorbing pallet of claim 1, wherein the one or more supporting layers are distributed evenly from a center of the shock-absorbing pallet around the one or more isolation devices.

13. A transportation system for servers, the transportation system comprising:
   a server rack; and
   a shock-absorbing pallet secured under the server rack and configured to move relative to the server rack to dampen vibration during transportation of the server rack, the shock-absorbing pallet including:
      a top cover;
      a bottom cover;
      a plurality of isolation devices disposed between the top cover and the bottom cover, each isolation device comprising a shock-absorbing component coupled to the top cover and the bottom cover, the shock-absorbing component having a suspension spring that compresses in a horizontal direction in response to an external force being applied in a vertical direction to the top cover, the top cover and the bottom cover extending along a length and a breadth that encompasses within its periphery all of the plurality of isolation devices; and
      one or more supporting layers secured between the top cover and the bottom cover around the one or more isolation devices, the one or more supporting layers forming in-between a plurality of slots for guiding a pallet lifter therethrough.

14. The transportation system of claim 13, wherein the shock-absorbing component further has a cylindrical body including:
   a first stopper panel coupled to a first bracket, the first bracket attached to the top cover;
   a second stopper panel opposite to the first stopper panel, the second stopper panel coupled to a second bracket that is attached to the bottom cover; and
   a suspension piston disposed in the cylindrical body and configured to move between the first bracket and the second bracket.

15. The transportation system of claim 14, wherein the suspension spring is disposed around the cylindrical body between the first stopper panel and the second stopper panel, wherein a displacement of the suspension piston causes the suspension spring to compress between the first stopper panel and the second stopper panel.

16. The transportation system of claim 13, wherein the top cover and the bottom cover are formed from a thermally-insulated material.

17. The transportation system of claim 13, wherein the shock-absorbing pallet has a length greater than a length of the server rack and the shock-absorbing pallet has a breadth greater than a breadth of the server rack.

18. The transportation system of claim 13, wherein the one or more isolation devices are disposed at or around a center of the shock-absorbing pallet to enable uniform force distribution.

19. The transportation system of claim 13, wherein each of the one or more supporting layers are formed from an elastic material, an elastomeric material, or a foam material.

20. The transportation system of claim 13, wherein the one or more supporting layers are distributed evenly from a center of the shock-absorbing pallet around the one or more isolation devices.

\* \* \* \* \*